(12) United States Patent
Klein et al.

(10) Patent No.: US 9,330,259 B2
(45) Date of Patent: May 3, 2016

(54) MALWARE DISCOVERY METHOD AND SYSTEM

(71) Applicant: TRUSTEER LTD., Tel Aviv (IL)

(72) Inventors: Amit Klein, Herzliya (IL); Yaron Dycian, Kadima (IL); Gal Frishman, Netanya (IL); Avner Gideoni, Cfar Haoranim (IL)

(73) Assignee: TRUSTEER, LTD., Tel Aviv (IL)

( * ) Notice: Subject to any disclaimer, the term of this patent is extended or adjusted under 35 U.S.C. 154(b) by 397 days.

(21) Appl. No.: 13/847,430

(22) Filed: Mar. 19, 2013

(65) Prior Publication Data

US 2014/0289851 A1    Sep. 25, 2014

(51) Int. Cl.
*G06F 21/56* (2013.01)
*G06F 21/54* (2013.01)

(52) U.S. Cl.
CPC .............. *G06F 21/566* (2013.01); *G06F 21/54* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,530,072 B1* | 5/2009 | Cheaz | ................... | G06F 9/5027 712/216 |
| 8,042,186 B1* | 10/2011 | Polyakov et al. | ............... | 726/24 |
| 8,572,739 B1* | 10/2013 | Cruz | ..................... | G06F 21/566 726/22 |
| 2004/0205694 A1* | 10/2004 | James et al. | .................. | 717/104 |
| 2005/0257265 A1* | 11/2005 | Cook | ...................... | G06F 21/53 726/23 |
| 2006/0143708 A1* | 6/2006 | Garvey | ................ | G06F 21/566 726/23 |
| 2006/0236396 A1* | 10/2006 | Horne | ................... | G06F 21/566 726/24 |
| 2007/0094726 A1* | 4/2007 | Wilson | ..................... | G06F 21/52 726/22 |
| 2007/0118534 A1* | 5/2007 | Hayes et al. | .................... | 707/10 |
| 2010/0169969 A1* | 7/2010 | Klein | ...................... | G06F 9/328 726/22 |
| 2011/0191850 A1* | 8/2011 | Turbin | ................... | G06F 11/00 726/24 |
| 2012/0324575 A1 | 12/2012 | Choi | | |
| 2014/0325650 A1* | 10/2014 | Pavlyushchik | ........ | G06F 21/566 726/23 |

FOREIGN PATENT DOCUMENTS

EP    1032877 B1    3/2002

OTHER PUBLICATIONS

Xiaoran Wang, "Process Injection Monitor | Break stuff, build stuff to break stuff" Jan. 11, 2013 http://www.attacker-domain.com/2013/01/process-injection-monitor.html.

Niels Provos, et al. "Virtual Honeypots: From Botnet Tracking to Intrusion Detection" Jun. 7, 2007, pp. 391-413, Pearson Education, Inc., Boston, MA, USA.

Author Unknown, "API Hooking with MS Detours" Oct. 14, 2008 URL:http://www.codeproject.com/Articles/30140/API-Hooking-with-MS-Detours.

(Continued)

*Primary Examiner* — Taghi Arani
*Assistant Examiner* — Phy Anh Vu
(74) *Attorney, Agent, or Firm* — Daniel J. Swirsky; AlphaPatent Associates Ltd.

(57) ABSTRACT

A process for identifying potentially harmful malware, comprises the steps of: a) identifying an executable that is about to run; b) providing a monitoring agent that monitors all threads that are descendent of a thread initiated by the process of said executable; and c) configuring said monitoring agent to conclude that a high probability of malware presence exists, if one of said descendent threads reaches a target process in which suspicious patches are created.

10 Claims, 1 Drawing Sheet

(56) References Cited

OTHER PUBLICATIONS

Author Unknown, "API hooking revealed", Dec. 2, 2002 URL:http://www.codeproject.com/Articles/2082/API-hooking-revealed.

G. Hunt, et al., "Detours: Binary Interception of Win32 Functions" Jul. 12, 1999 URL:ftp://ftp.research.microsoft.com/pub/tr/tr-98-33.pdf.

* cited by examiner

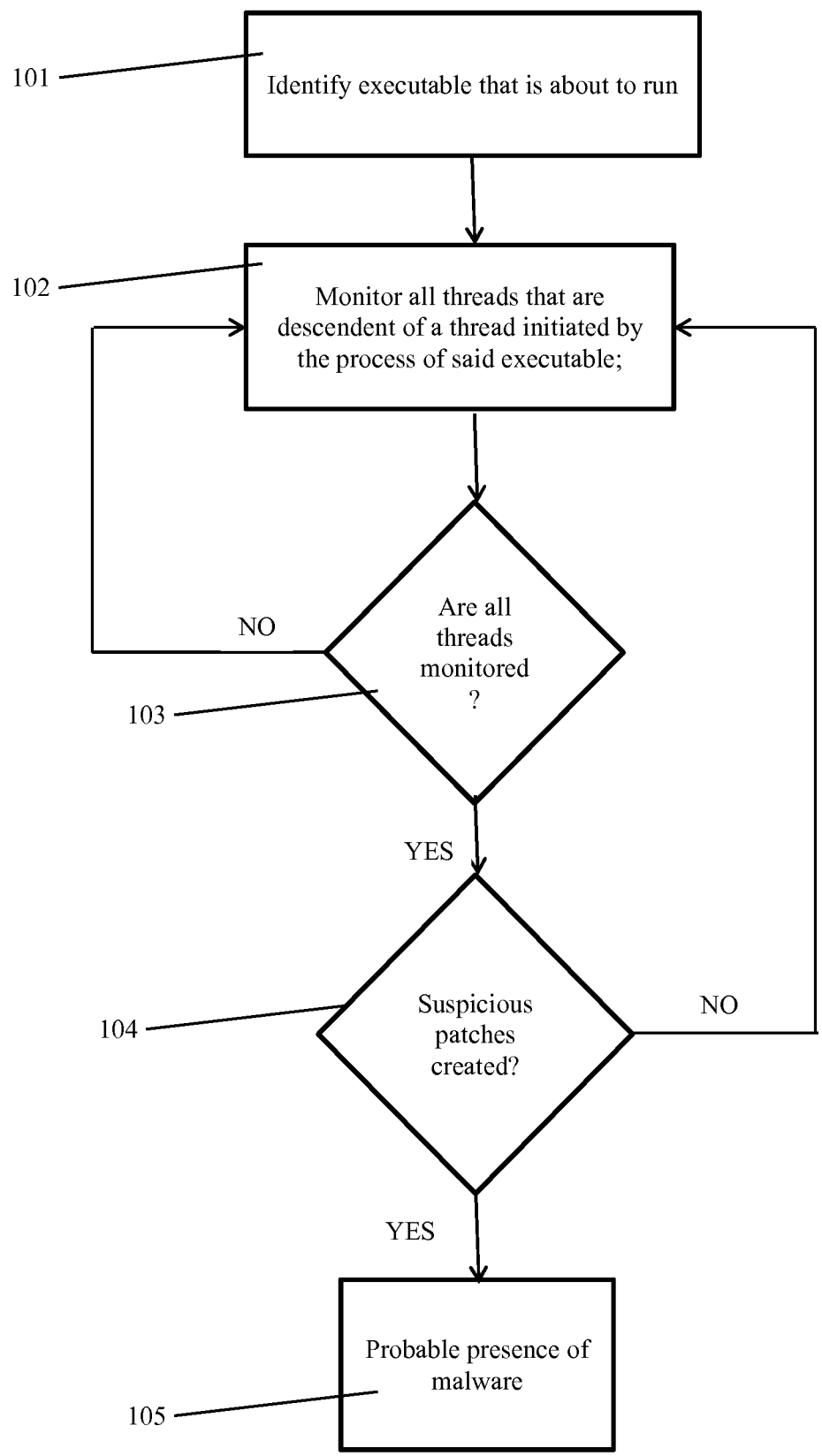

MALWARE DISCOVERY METHOD AND SYSTEM

FIELD OF THE PREFERRED EMBODIMENTS

The preferred embodiments relate to the field of software security.

BACKGROUND INFORMATION

One of the most efficient ways to defend against malware attack is by actively identifying the potential presence of malware at the earliest possible time, as compared to the more passive approach of periodically scanning a computer system for the presence of malware, typically identified by its signature. However, malware is constantly developed, which has different ways to make it more difficult to identify.

The art constantly seeks new and improved ways to fight malware, but few solutions exist to date, to identify the potential presence of malware at an early stage.

An exemplary embodiment may provide a method and system that overcomes the shortcomings of existing anti-malware solutions and which is capable of providing an early detection of the potential presence of malware in a computer system.

An exemplary embodiment may provide an anti-malware solution that does not substantially encumber the computer system that uses it.

These and other drawbacks exist.

SUMMARY OF THE PREFERRED EMBODIMENTS

In one aspect an exemplary embodiment relates to a process for identifying potentially harmful malware, comprising the steps of:
 a) identifying an executable that is about to run;
 b) providing a monitoring agent that monitors all threads that are descendent of a thread initiated by the process of said executable; and
 c) configuring said monitoring agent to conclude that a high probability of malware presence exists, if one of said descendent threads reaches a target process in which suspicious patches are created.

In one embodiment, the target process is a browser.

According to one embodiment, when the monitoring agent identifies an executable that is about to run it checks its cryptographic hash algorithm, to determine whether has run in the system before. The cryptographic hash algorithm can be any suitable algorithm and is selected, for instance, from MD5, SHA1 and SHA2. In one embodiment, if it appears that the executable is running the first time, the monitoring agent continues to follow it. In another embodiment, the monitoring agent follows the process each time it runs.

Although the disclosed embodiments are not limited to any specific operating system, according to one embodiment, the monitoring agent operates in a Windows environment, watches for a CRT (Create Remote Thread) function and creates a hook to the CRT.

An exemplary embodiment may also efficiently operate when the executable creates a thread in a legitimate system process in which case, according to one embodiment, a CRT is done to each thread opened by a legitimate process. In an alternative embodiment, the monitoring agent checks from which thread the new CRT originates and only follows it if said CRT comes from a suspicious thread.

The monitoring agent can also maintain a white list of legitimate processes with suspicious behavior, which may streamline its operation, although an exemplary embodiment can operate without any such white list.

When the monitoring agent concludes that there is a probability of the presence of malware, corrective action is performed, which can be of any type and may include, for instance, quarantining or blocking the malware, alerting a user or a designated entity of the danger, etc.

In another aspect an exemplary embodiment is directed to a monitoring agent configured to follow all threads that are descendent of a thread initiated by the process of an executable. In one embodiment, the monitoring agent is configured to conclude that a high probability of malware presence exists, if one of said descendent threads reaches a target process in which suspicious patches are created.

BRIEF DESCRIPTION OF THE DRAWINGS

The present disclosure, together with further objects and advantages, may best be understood by reference to the following description taken in conjunction with the accompanying drawings, in which:

FIG. 1 is a schematic flow chart of a process according to an exemplary embodiment.

DETAILED DESCRIPTION OF THE PREFERRED EMBODIMENTS

In the description to follow the terms "malware", "potentially harmful code" and "malicious code" are used interchangeably. The preferred embodiments address the problem of dealing with the tactics used by many types of malware, which when they start running inject malicious code into a legitimate processes of the system. As soon as injection is completed the malware process ends and the malware now runs in its own thread that runs in the aforesaid legitimate system processes. Because the process is legitimate, identifying the presence of the malware is rendered substantially more difficult.

However, injecting a thread into a legitimate system process is not the end purpose of the malware, which typically aims for a different target process. In many cases the target is a browser, in which case the malware will check which browser process is open and will inject a code therein.

An exemplary flow of the process followed by the malware is the following:
 1. Periodically (e.g. every 100 ms) enumerate all processes in the system;
 2. Identify target processes by name (e.g. "firefox.exe", "iexplore.exe");
 3. Inject malicious code into the target process e.g. using WriteVirtualMemory; and
 4. Create a remote thread whose body is the malicious code using CreateRemoteThread.

As will be apparent to the skilled person, this process (i.e., the creation of a new thread in a different process from which where the malware is currently running) can be performed a number of times, thereby creating a chain of threads, originating from the original malware up to the target process. According to an exemplary embodiment, monitoring of the processes running in the system comprises identifying both the origin and the target of the malware. For instance, if a new thread has been established in a target process and, when the new thread runs, hooks or patches to sensitive processes are identified, according to an exemplary embodiment, the chain of threads is considered suspicious. A further example is a situation in which the original process does not run from the Program Files folder, but from another folder such as the Temp folder, which in itself is suspicious and in which case categorizing the process as potentially malicious can also be done with greater confidence by examining additional elements, such as a missing digital signature, a particularly small file size, etc.

As illustrated in FIG. 1, an exemplary embodiment operates by following the activity of process thread, essentially as follows:

1. The monitoring agent according to an embodiment identifies an executable that is about to run (step 101), checks its cryptographic hash algorithm (for instance, MD5 or SHA1 or SHA2) and determines if it has run in the system before. If it appears that this is the first time this executable runs, the monitoring agent will continue following it.
2. Optionally, the monitoring agent can follow the process each time it runs, for instance for the case that the malware has been programmed to run innocuously for a number of times before starting its malicious activity.
3. When running in a Windows environment the monitoring agent watches for a CRT (Create Remote Thread) function, which is typically used by malware (step 102). The monitoring agent of an embodiment can operate through a kernel driver or a user space implementation, in which case it creates a hook to the CRT and when the suspicious process calls it, the monitoring agent verifies the identity of the process in which it creates a thread. Additionally, the same is done with the target process and a hook is created to its CRT.
4. In one embodiment, CRT monitoring is applied to each thread opened by the legitimate process (step 103). In an alternative embodiment, the monitoring agent checks from which thread the new CRT originates by asking "in which thread I'm running", and only follows it if said CRT comes from a suspicious thread (step 104). This alternative embodiment is more efficient than the previous one, although both alternatives can be used.

The monitoring agent, according to an exemplary embodiment, can be of any suitable type, known to the skilled person, and may be, for instance, a kernel driver that monitors the ZwCreateProcess kernel call. Alternatively the CreateProcess function can be patched in almost all userspace processes.

As will be appreciated by the skilled person, it is possible that one thread will open new local threads, and that one of them will do a CRT directed outwards. According to an exemplary embodiment, the monitoring agent monitors all threads that are descendent of the original process (step 103). Optionally, the monitoring process may include marking the threads, but marking is not necessary to carry an exemplary embodiment, although it may be convenient in some cases. If one of these descendent threads reaches a browser and suspicious patches are created (step 104), the monitoring agent concludes that a high probability of malware presence exists (step 105).

Once a potential malware is identified the monitoring agent can take any suitable action, such as alerting a user, placing the executable in quarantine, stopping one or more processes/threads, etc. All said actions are conventional and well known to the skilled person and, therefore, are not described herein in detail.

Of course, there may be occurrences of perfectly legitimate processes behaving in a way similar to malware, at least for part of the process, but without ultimately creating any malicious event. According to an exemplary embodiment, the monitoring agent maintains a white list of such legitimate processes with suspicious behavior, to avoid the need for repeated monitoring thereof.

EXAMPLE

Persons skilled in the art will easily recognize malware against which an embodiment can be used. One illustrative example of such malware is the Zeus malware, which is a classic example for CRT chain. From http://www.mnin.org/write/ZeusMalware.pdf the following relevant passages illustrate this matter:

"This trojan in particular invokes a thread from its own code base from within a remote process by first writing its entire image into a region on the remote process' heap; and then calling CreateRemoteThread( )specifying the address of the desired sub routine. This is used to infect winlogon.exe from prg.exe; and how winlogon.exe infects svchost.exe; and how svchost.exe infects all other processes".

The above statements are particularly relevant to browsers. The description further explains that "the thread that executes inside all system processes is responsible for hooking, among others, the HttpSendRequestA( )and HttpSendRequestW( )exports from wininet dll.

Therefore, any time an infected process calls one of these functions for HTTP communication, data in the request buffer is able to be examined by the redirected function.

All the above description and examples have been provided for the purpose of illustration and are not intended to limit the embodiments in any way, except as provided for in the appended claims.

The invention claimed is:

1. A method for identifying potentially harmful malware, comprising the steps of:
    a) identifying, on a processor, an executable that is about to run;
    b) providing, on the processor, a monitoring agent that monitors
        a suspicious process of the executable,
        a thread of a legitimate process, initiated by the suspicious process of the executable, and
        a descendent thread initiated by the legitimate process, wherein the monitoring agent
            monitors creation of any threads by placing a hook on a thread creation function,
            checks from which thread any of the threads originates, and
            monitors any of the threads that descend from the suspicious process; and
    c) determining, on the processor using the monitoring agent, that a high probability of malware presence exists if a suspicious patch is created in a target process by the descendent thread initiated by the legitimate process.

2. The method of claim 1, wherein the target process is a browser process.

3. The method of claim 1, wherein when the monitoring agent identifies an executable that is about to run, the monitoring agent checks a cryptographic hash algorithm to determine whether the executable has run in the at least one processor before.

4. The method of claim 3, wherein if it appears that the executable is running for the first time, the monitoring agent continues to monitor the executable.

5. The method of claim 3, wherein the monitoring agent monitors the executable each time the executable runs.

6. The method of claim 3, wherein the cryptographic hash algorithm is selected from MD5, SHAT and SHA2.

7. The method of claim 1, wherein the monitoring agent operates in a Windows environment.

8. The method of claim 1, wherein the executable creates a thread in a legitimate system process.

9. The method of claim 1, wherein the monitoring agent maintains a listing of at least one legitimate process with a suspicious behavior.

10. The method of claim 1, further comprising:
   d) performing corrective action when the monitoring agent determines that a high probability of malware presence exists.

\* \* \* \* \*